(12) United States Patent
Hiscock

(10) Patent No.: US 8,971,379 B2
(45) Date of Patent: Mar. 3, 2015

(54) CHIRP MODULATION

(71) Applicant: Cambridge Silicon Radio Limited, Cambridge (GB)

(72) Inventor: Paul Dominic Hiscock, Cambridge (GB)

(73) Assignee: Cambridge Silicon Radio Limited, Cambridge (GB)

(*) Notice: Subject to any disclaimer, the term of this patent is extended or adjusted under 35 U.S.C. 154(b) by 0 days.

(21) Appl. No.: 13/911,581

(22) Filed: Jun. 6, 2013

(65) Prior Publication Data

US 2014/0362891 A1 Dec. 11, 2014

(51) Int. Cl.
H04B 1/69 (2011.01)
H04L 27/10 (2006.01)

(52) U.S. Cl.
CPC .................................. H04L 27/103 (2013.01)
USPC ...................................................... 375/139

(58) Field of Classification Search
USPC ...................................................... 375/139
See application file for complete search history.

(56) References Cited

U.S. PATENT DOCUMENTS 3,099,796 A 7/1963 Zadoff
5,852,418 A * 12/1998 Ferrell et al. .................. 342/202
6,549,562 B1 * 4/2003 Olaker et al. ................. 375/139
2002/0009125 A1 1/2002 Shi
2009/0180518 A1 * 7/2009 Ishii et al. .................... 375/130
2011/0064119 A1 * 3/2011 Sforza ........................... 375/139
2012/0314730 A1 12/2012 McCorkle et al.

FOREIGN PATENT DOCUMENTS

CN 103001903 3/2013
GB 2490177 10/2012

OTHER PUBLICATIONS

Dutta, et al., "Performance of Chirped-FSK and Chirped-PSK in the Presence of Partial-band Interference", Communications and Vehicular Technology in the Benelux (SCVT), pp. 1-6, Nov. 22-23, 2011.
Popovic, "Generalized Chirp-Like Polyphase Sequences with Optimum Correlation Properties," Information Theory, IEEE Transactions, vol. 38, No. 4, pp. 1406-1409, Jul. 1992.
GB Search Report issued in related GB Application No. 1321070.3=, dated Apr. 29, 2014.

* cited by examiner

Primary Examiner — Don N Vo
(74) Attorney, Agent, or Firm — RatnerPrestia

(57) ABSTRACT

Apparatus for generating and encoding data onto chirp signals, said apparatus including a chirp generator configured to generate a chirp; a cyclic frequency offset modulator configured to set the cyclic frequency offset of the chirp to a cyclic frequency offset selected from a plurality of predetermined cyclic frequency offsets; and a phase modulator configured to modulate the chirp onto a signal to form a chirp signal symbol at a phase offset selected from a plurality of predetermined phase offsets.

20 Claims, 5 Drawing Sheets

CHIRP MODULATION

FIELD OF THE INVENTION

The present invention relates to improving the quality of communications. Aspects of the invention relate to improving the data rate of chirp communications.

BACKGROUND

A well understood problem in the field of telecommunications is the need for improved sensitivity as ranges increase and as interference environments become more hostile. One method of addressing this problem is to increase symbol size, for example by duplication of samples. This allows a receiver device multiple attempts at decoding each data symbol and provides the possibility of averaging results over multiple attempts. However, this can significantly reduce data rate.

What is needed is a communication technique which provides improved sensitivity without significant sacrifices to data rate.

SUMMARY

According to a first aspect of the invention, there is provided apparatus for generating and encoding data onto chirp signals, said apparatus comprising: a chirp generator configured to generate a chirp; a cyclic frequency offset modulator configured to set the cyclic frequency offset of the chirp to a cyclic frequency offset selected from a plurality of predetermined cyclic frequency offsets; and a phase modulator configured to modulate the chirp onto a signal to form a chirp signal symbol at a phase offset selected from a plurality of predetermined phase offsets.

According to a second aspect of the invention, there is provided a communication device comprising apparatus according to the first aspect together with a transmitter configured to transmit the chirp signal symbol or a modified version thereof.

According to a third aspect of the invention, there is provided apparatus for decoding received chirp signals, said apparatus comprising: a cyclic frequency offset detector configured to compare the cyclic frequency offset of a received chirp signal symbol with a plurality of predetermined cyclic frequency offsets and decode a first set of data bits according to which of said plurality of predetermined cyclic frequency offsets the chirp signal symbol's cyclic frequency offset best matches; and a phase detector configured to compare the phase offset at which a chirp is detected in the received chirp signal symbol with a plurality of predetermined phase offsets and decode a second set of data bits according to which of said plurality of predetermined phase offsets the chirp signal symbol's phase offset best matches.

According to a fourth aspect of the invention, there is provided a communication device comprising apparatus according to the third aspect together with a receiver configured to receive the received chirp signal.

According to a fifth aspect of the invention, there is provided a communication device according to the fourth aspect further comprising apparatus according to the first aspect together with a transmitter configured to transmit the chirp signal referred to in the first aspect.

According to a sixth aspect of the invention there is provided a communication system comprising a communication device according to the second or fifth aspects and a communication device according to the fourth or fifth aspects.

According to a seventh aspect of the invention there is provided a method for generating and encoding data onto chirp signals, said method comprising: generating a chirp; setting the cyclic frequency offset of the chirp to a cyclic frequency offset selected from a plurality of predetermined cyclic frequency offsets; and modulating the chirp onto a signal to form a chirp signal symbol at a phase offset selected from a plurality of predetermined phase offsets.

According to an eighth aspect of the invention there is provided a method for decoding received chirp signals, said method comprising: comparing the cyclic frequency offset of a received chirp signal symbol with a plurality of predetermined cyclic frequency offsets and decoding a first set of data bits according to which of said plurality of predetermined cyclic frequency offsets the chirp signal symbol's cyclic frequency offset best matches; and comparing the phase offset at which a chirp is detected in the received chirp signal symbol with a plurality of predetermined phase offsets and decoding a second set of data bits according to which of said plurality of predetermined phase offsets the chirp signal symbol's phase offset best matches.

According to a ninth aspect of the invention there is provided a computer program comprising code means adapted to perform the steps of either of the seventh or eighth aspects when the program is run on processor apparatus.

According to a tenth aspect of the invention there is provided a computer program embodied on a computer-readable medium, configured to control the method of either of the seventh or eighth aspects.

BRIEF DESCRIPTION OF THE DRAWINGS

Aspects of the present invention will now be described by way of example with reference to the accompanying figures. In the figures.

DETAILED DESCRIPTION

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

It has been found that encoding data using symbols formed from chirps or other spread spectrum codes offers sensitivity advantages over some other modulation techniques used in wireless communication protocols such as Bluetooth™, e.g. differential quadrature phase shift keying (DQPSK). This is because chirps provide a way of spreading energy over multiple samples, which can be recombined using coherent correlation to create a single, stronger signal that is easier to detect in a noisy environment than a simple non-spread modulated signal.

Encoding data onto chirps using a combination of gradient modulation, cyclic frequency modulation and phase modulation can also be more efficient than DQPSK. For example, the Eb/No (signal to noise ratio input times bandwidth per bit rate) for DQPSK is 12.5 dB away from the ultimate Shannon coding limit, whereas a length 257 Zadoff-Chu chirp modulated with 18 bits of data (8 bits encoded using a selection from 256 gradients, 8 bits encoded using a selection from 256 cyclic frequency shifts and 2 bits encoded using a selection from 4 quadrature phases) is only 4.8 dB from the Shannon coding limit. Therefore more data bits can be successfully communicated from a transmitter to a receiver for a given amount of transmitted energy using this type of chirp modulation than using conventional DQPSK. High data rate signalling can therefore be provided for unexpectedly low transmitter power.

Figure 1:
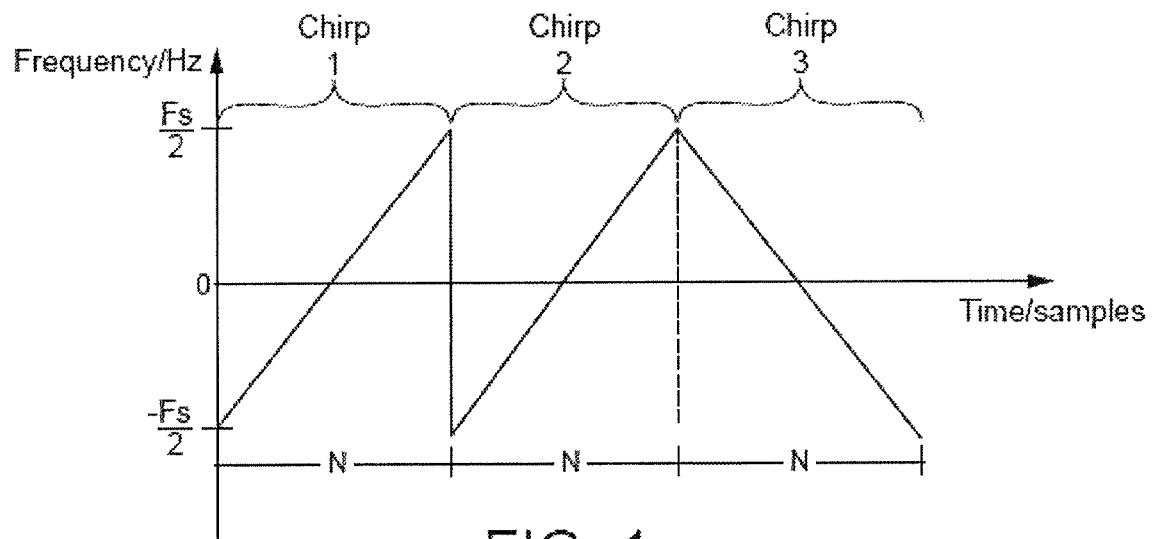
FIG. 1 is a representation of three consecutive chirps.
Figure 2:
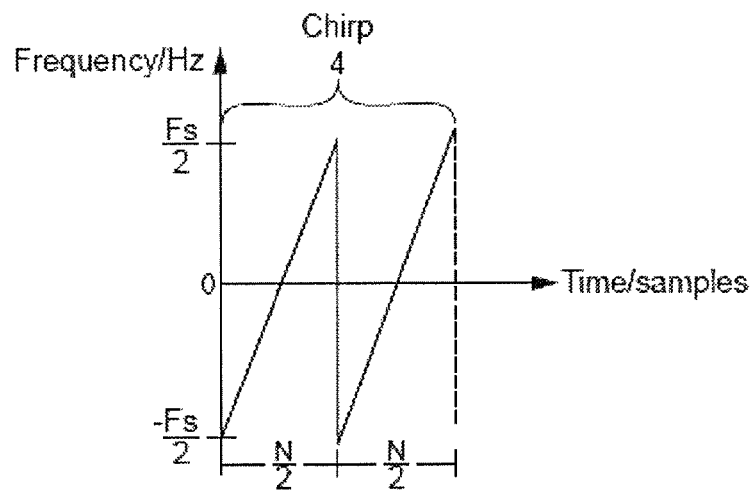
FIG. 2 is a representation of a chirp having a gradient of 2.

The chirp modulation method is a modulation method in which the frequency of a signal varies linearly over time in a bandwidth as shown in FIGS. 1 and 2. The bandwidth can be expressed as $F_s$; $F_s$ being a value in Hz. A chirp can be represented by a sequence of N samples. Therefore the duration of a chirp can be expressed as N; N being a number of samples. (Typically, a receiver will sample periodically so that sample number scales linearly with time.)

A chirp having a positive gradient in the frequency-time plane can be referred to as an "up" or "forward" chirp, for example chirp 1 and chirp 2 of FIG. 1. A chirp having a negative gradient in the frequency-time plane can be referred to as a "down" or "reverse" chirp, for example chirp 3 of FIG. 1.

The gradient of a chirp can take any value greater than 0 and less than N. Due to the modular nature of chirps negative gradients are obtained from N−1 backwards. For example, a positive gradient of N−2 is equivalent to a negative gradient of −2.

Chirp 1 of FIG. 1 has a starting frequency of $-F_s/2$ and a gradient of 1. It increases linearly in frequency over a period of N samples by $F_s$ to reach a frequency close to $+F_s/2$. Since this is a complex sampled system $+F_s/2$ is equivalent to $-F_s/2$. FIG. 1 illustrates an example in which two consecutive chirps have the same symbol value, whereas the third chirp is different. An apparent discontinuity in frequency between chirp 1 and chirp 2 occurs at sample number n=N.

Chirp 4 of FIG. 2 has a gradient of 2 and a starting frequency of $-F_s/2$. Since it has double the gradient of the chirps of FIG. 1, it increases linearly in frequency to $+F_s/2$ in half the number of samples that the chirps in FIG. 1 do, i.e. it reaches close to $+F_s/2$ after close to N/2 samples. The chirp then wraps around in frequency. Since this is a sampled system, these frequency wraps are in effect continuous and have continuous phase. The chirp repeats the frequency sweep from $-F_s/2$ to $+F_s/2$ between samples N/2 and N.

One or more identical contiguous chirps can form a symbol that represents a data value to be communicated. Where there are more than one identical contiguous chirps in a symbol, each chirp individually conveys the same value which is the symbol value of the symbol.

The chirps also have continuous frequency and phase from one end of the chirp to the other. A cyclic shift of the samples that make up a chirp creates another valid chirp.

Chirps can be used to encode data in a variety of ways. Binary data can be transmitted using up and down chirps to represent zeros and ones respectively (or vice-versa). M-ary data can be encoded using M different cyclic rotations of a chirp. A transmitter can convey its identity using a sequence of chirps having different gradients. Data can also be encoded in the gradients of Zadoff-Chu codes. For Zadoff-Chu codes N is a prime number and the chirp consists of complex-valued sequences each having the property that cyclically shifted versions of the sequence imposed on a signal result in zero cross-correlation with one another.

Figure 3:
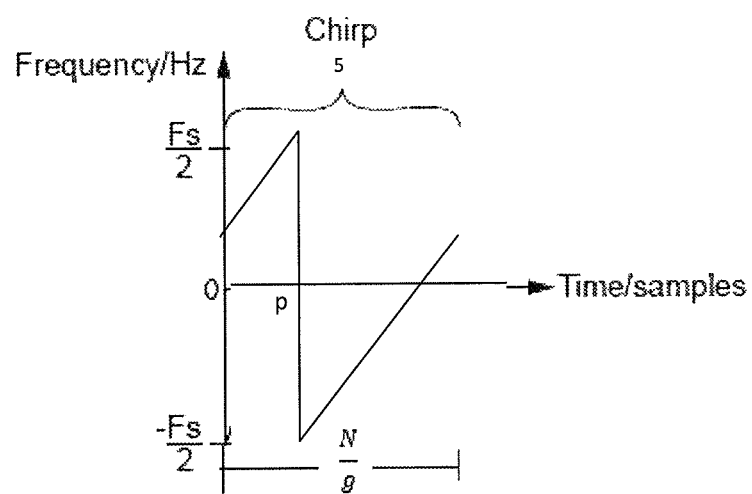
FIG. 3 illustrates a cyclic frequency offset.

FIG. 3 shows a chirp 5 with a gradient g and cyclic frequency offset p. Data can be encoded by one or both of these values.

In this context a cyclic frequency offset means that all frequency components in the chirp symbol are shifted modulo the sample rate. For example, given a sample rate of $F_s$ Hz, a signal with a frequency component at $F_s/2-30$ Hz, when shifted by +100 Hz, will move to a frequency of $-F_s/2+70$ Hz. This cyclic frequency offset can be any value between $-F_s/2$ and $F_s/2$ and is not limited to integer values.

In one example encoding scheme g can be selected from a predetermined set of G different gradients. The value of g then encodes $B_G$ binary data bits, where:

$$B_G = \log_2 G \qquad (1).$$

Similarly, p can be selected from a predetermined set of P different cyclic frequency offsets. The value of p then encodes $B_P$ binary data bits, where:

$$B_P = \log_2 P \qquad (2).$$

Transmitted symbol values can then be decoded at a receiving device by comparing the gradient or cyclic frequency offset of a received chirp as appropriate with each of the predetermined set of possible values.

This comparison can for example be performed using one or more correlators. Such correlators can suitably be used to correlate the received chirp with one or more reference chirps. The received chirp will correlate strongly with a reference chirp having the same gradient, and weakly with all other reference chirps. Therefore, if data is encoded by the gradient of a chirp, the symbol value can be decoded by correlating the received chirp with a set of different reference chirps with a selection of respective distinct test gradients that include a gradient corresponding to the encoded gradient. For example, the set of reference chirps could have respective test gradients corresponding to the set of gradients $g_i$ in the gradient symbol set used for encoding. Optionally, the set of reference chirps could comprise chirps having additional test gradients. For example, the set of reference chirps could consist of chirps with test gradients corresponding to every possible gradient from 0 to N−1. The test gradient which produces the largest absolute correlation value can be used to identify the most likely index k of the symbol value encoded by the gradient of the received chirp, $g_k$.

In a cyclic correlator a correlation of a received chirp or a modified version thereof with a reference chirp having a gradient corresponding to that of the received chirp is performed for a set of different test cyclic frequency offsets. If data is encoded by the cyclic frequency offset of a received chirp, that set of test cyclic frequency offsets could for example correspond to the set of cyclic frequency offsets $p_i$ in the cyclic frequency offset symbol set used for encoding. Optionally, the set of test cyclic frequency offsets could comprise additional cyclic frequency offsets. For example, the set of test cyclic frequency offsets could consist of every possible cyclic frequency offset from 0 to N−1. The symbol value encoded by the cyclic frequency offset of the received chirp can be decoded by identifying the test cyclic frequency offset which produces the largest absolute correlation result value (correlation magnitude).

Data rate can be improved by encoding data at a transmitting device using both gradient and cyclic frequency offset modulation simultaneously and, for example, decoding that data at a receiving device using correlation magnitudes. For example, a cyclic correlation with test cyclic frequency offsets corresponding to each $p_i$ value can be performed with a reference chirp having a gradient corresponding to each $g_i$ value and the absolute values of all of those complex correlation results can be taken. This produces a composite set of correlation magnitudes consisting of G reference chirp result sub-sets, each consisting of P correlation magnitudes, giving a total of $$C = P \cdot G \qquad (3)$$

individual correlation magnitudes. The values of p and g can then be respectively ascertained from the cyclic frequency offset of the largest correlation magnitude in the entire composite set and the reference chirp subset in which it is found. This modulation scheme provides a total number of binary data bits per symbol of:

$$B_{G\&P} = B_G + B_P \qquad (4).$$

It has been found that the data rate can be improved still further by making use of the complex values of the correlation results, in addition to their absolute values. This can be achieved by extending the modulation scheme to include phase modulation (in addition to gradient and cyclic frequency modulation), as described below.

In addition to gradient and cyclic frequency offset modulation, data can be encoded by adjusting the phase offset of the chirps in such a way that it can be recovered at a receiving device. For example, a phase offset $\phi$ can be selected from a predetermined set of $\Phi$ different phase offsets. The value of $\phi$ then encodes $B_\Phi$ binary data bits, where:

$$B_\Phi = \log_2 \Phi \qquad (5).$$

The value of $\phi$ can be decoded by identifying the phase offset of the complex value of the correlation result from which the largest overall correlation magnitude is derived. This requires means for identifying the complex values of correlation results before their magnitudes are selected by ABS functionality for gradient and cyclic frequency offset decoding.

It has been found that using phase modulation in addition to gradient and cyclic frequency offset modulation only requires an increase in sensitivity level (i.e. the receive power required to achieve a given BER) of a small fraction of a dB. Hence, the increased data rate due to the phase modulation costs little in terms of link budget, which helps improve the overall efficiency of the modulation scheme.

This modulation scheme provides a total number of binary data bits per symbol of:

$$B_{G\&P\&\Phi} = B_G + B_P + B_\Phi \qquad (6).$$

The resulting data rate R scales linearly with both $B_{G\&P\&\Phi}$ and the number of symbols transmitted per unit time, S:

$$R = B_{G\&P\&\Phi} \cdot S \qquad (7).$$

Therefore, the larger the symbol set sizes G, P, $\Phi$ used, the greater the data rate available.

Suitably, the constituents of the symbol sets $g_i$, $p_i$, $\phi_i$ are evenly distributed to improve the chance of symbols being decoded correctly. For example, the phase modulation can use quadrature phase shift keying (QPSK), with $$\Phi = 4; \varphi_i = i \cdot \frac{\pi}{2}; i = \{0, 1, 2, 3\}. \qquad (8)$$

This modulation scheme allows encoding of $$B_4 = \log_2 4 = 2 \qquad (9)$$

binary data bits in the phase of each symbol.

If the link quality is poor however, data rate can be sacrificed for the sake of lower error rates. One way of achieving this is to use smaller symbol sets G, P, $\Phi$. This reduces the chance of symbols being incorrectly decoded.

In one example scheme, if a bit error rate (BER) is determined to have risen above a threshold, the phase modulation can switch from QPSK to binary phase shift keying (BPSK), with $$\Phi = 2; \phi_i = i \cdot \pi; i = (0,1) \qquad (10),$$

sacrificing the data rate for the sake of improved BER. In this example the data rate would be halved, since $$B_2 = \log_2 2 = 1 \qquad (11)$$

which is half of the number of bits encoded in the phase of each symbol for QPSK; see equation (9).

Reducing P can be particularly advantageous for example when phase noise and/or timing errors and/or multipath are a significant problem. This is because phase noise, timing errors and multipath can all cause the correlator results to have a significant response in additional side-bins either side of the main signal bin, i.e. side-peaks can appear close to the correlation peak corresponding to the encoded cyclic frequency offset symbol. In the presence of noise these side-peaks can be larger than the main symbol peak. This can cause decoding errors if their separation from the main symbol peak is greater than approximately half the separation between adjacent cyclic frequency offsets in the cyclic frequency offset symbol set. By choosing a smaller, and suitably spread, cyclic frequency offset symbol set size P, the chances of this occurring are reduced. Therefore the bit error rate is reduced at the expense of data rate.

Alternatively or additionally, improved sensitivity can be achieved by increasing the number of contiguous identical chirps per symbol when encoding and oversampling when decoding. This effectively reduces S in equation (7), so again the sensitivity improvement comes at the expense of data rate, R.

Individual schemes could be tailored to balance the data rate against the sensitivity according to the specific context. For example, one or more of $B_G$, $B_P$, $B_\Phi$ and S could be adjusted on the fly to keep R and/or the BER (or other link quality measure) within appropriate predetermined bounds. Such bounds could be adjustable, whether manually or automatically according to a context change. For example, data rate could be considered more important, and thus the lower bound for R could be increased, when media data such as audio or video is being communicated, as opposed to less time-critical control signals.

An example proposed modulation scheme could employ Zadoff-Chu chirps. (Other forms of linear chirps with selectable gradients could also be used however.) For Zadoff-Chu chirps, a complete chirp symbol can be cyclically shifted by any integer number of samples by adding an appropriate cyclic frequency offset and applying a phase correction. Equation (12) below defines a Zadoff-Chu chirp w(n) of length N samples with gradient g and integer sample index n where j is the square root of minus one. Equation (13) shows that w(n) can be cyclically shifted by p samples, by multiplication of the original chirp w(n) by a cyclic frequency offset term $$\frac{-gp}{N} F_s \text{Hz},$$

and applying a phase correction of $$\frac{\pi}{N}gp(p-1)$$

radians.

$$w(n) = \exp\left[\frac{j\pi}{N}gn(n+1)\right] \Big| n = 0 \text{ to } N-1 \quad (12)$$

$$w(n-p) = w(n)\exp\left[\frac{j\pi}{N}gp(p-1)\right]\exp\left[\frac{-2j\pi}{N}gnp\right] \Big| n = 0 \text{ to } N-1 \quad (13)$$

In some example schemes p could be limited to taking integer values. In other examples p could be permitted to take fractional values.

One example modulation scheme is as follows. The $k^{th}$ value in an array of K modulation values $v_k$ to be transmitted comprises three parts:

$$v_k = \{g_k, p_k, \phi_k\} \quad (14)$$

The first part indexes the set of gradients G to select $g_k$, the second part indexes the set of cyclic frequency offsets P to select $p_k$ and the third part indexes the set of phase offsets Φ to select $\phi_k$.

The phase modulation in this example uses Gray encoding such that the phase is modulated by $$\theta_k = \frac{j\pi}{2}\sum_{i=1}^{k} graymap[\varphi_k] \quad (15)$$

where $$graymap(0..3) = (0,1,3,2) \quad (16).$$

The phase modulation in this example is also differential, with the first symbol set to zero as a reference:

$$\phi_1 = 0 \quad (17).$$

This avoids having to know the absolute phase of the first symbol.

An example equation which generates a baseband IQ signal $w_k(n)$ that encodes a value $v_k$ using gradient modulation, cyclic frequency offset modulation and phase modulation has the form:

$$w_k(n) = \exp\left[\frac{j\pi}{N}g_k n(n+1)\right]\exp\left[\frac{-j\pi g_c}{N}2p_k n\right] \quad (18)$$

$$\exp\left[\theta_k + \frac{j\pi g_c}{N}(p_k^2 - p_k)\right] \Big| n = 0 \text{ to } N-1$$

where $g_c$ is a fixed gradient which will be explained below.

The first exponential term in equation (18) generates a Zadoff-Chu chirp encoded with gradient $g_k$.

The second exponential term in equation (18) encodes the value $p_k$ using cyclic frequency offset modulation, such that following a detection process involving multiplication by a suitable chirp with gradient $g_c - g_k$, followed by a cyclic correlation against a conjugate chirp with gradient $g_c$, the position of the main peak in the resulting correlation magnitudes can be uniquely mapped to $p_k$. This term offsets the frequency of the chirp modulo the sample rate.

The third and final exponential term in equation (18) applies the phase modulation and corrects an unwanted phase rotation related to the cyclic frequency offset modulation.

Suitably, the complex digital baseband signal $w_k(n)$ is scaled, quantised and oversampled. For example, linear interpolation by a factor of 16 can be used for oversampling. This oversampled IQ signal is then suitably converted into an analogue signal, for example using a DAC device. The analogue signal is suitably filtered and multiplied by a radio frequency (RF) carrier, for example using an RF mixer. Finally, the signal is suitably transmitted following filtering by an RF filter.

Since the expression in equation (18) is a product of exponential terms with imaginary parameters, its magnitude is always unity. Therefore this modulation scheme lends itself to being modulated at RF using a polar modulator. A polar modulator is a device which outputs a frequency in proportion to an input voltage from a signal. Equation (18) can be re-written in terms of frequency versus sample index n by differentiating the three summed phase expressions (the exponential function parameters) with respect to n. This process excludes the third phase offset term, which differentiates to 0 and is handled below. Suitably, the digital frequency signal is oversampled, converted to an analogue signal, filtered and passed to the polar modulator. The phase part of the third exponential term is suitably applied by adding a short frequency adjustment pulse, proportional to the desired phase change, at the start of each chirp symbol to be transmitted. The integrated area of this pulse determines the phase offset added (phase=frequency×time) so can be used to determine the phase scale factor.

Figure 4:
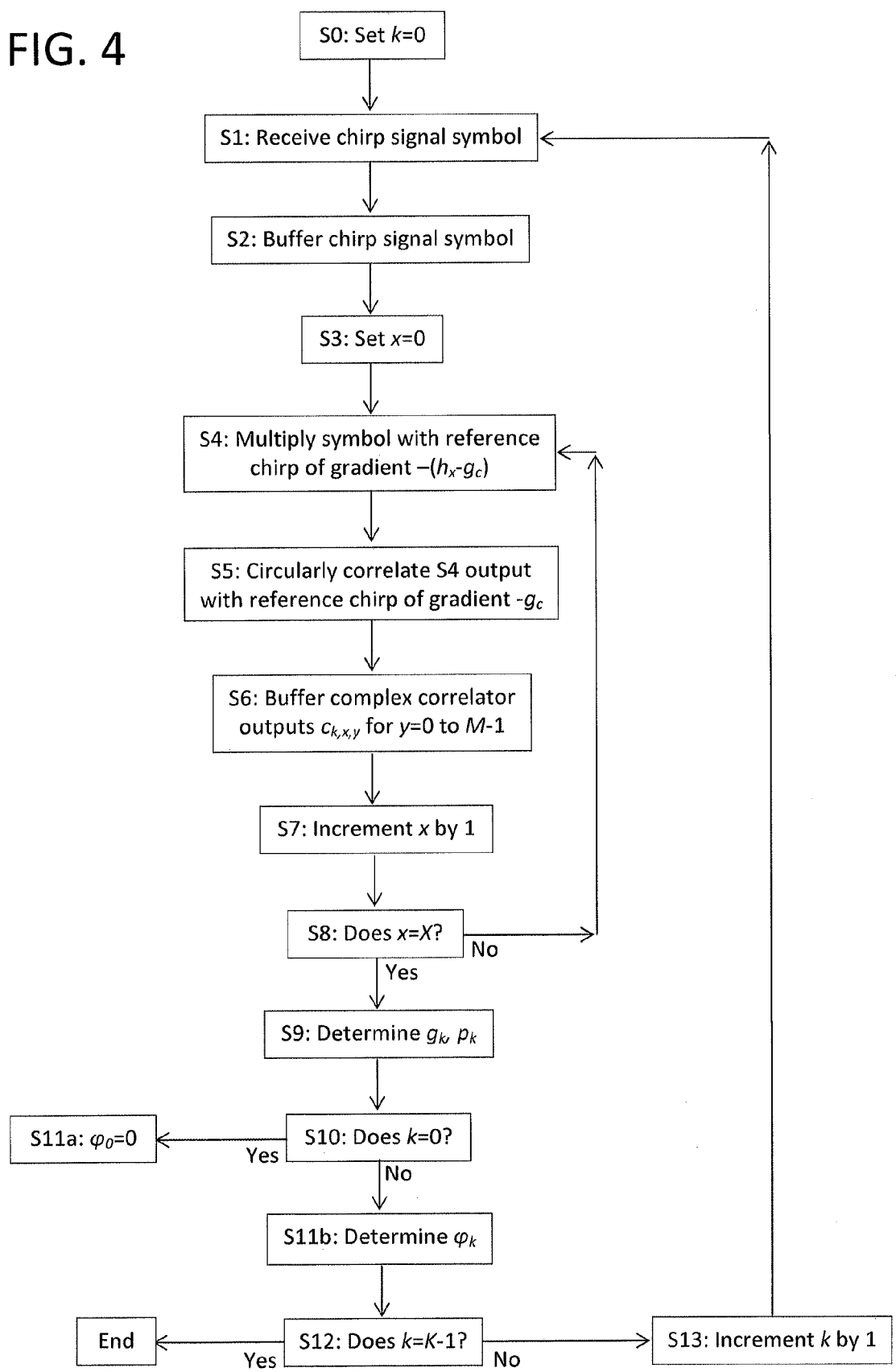
FIG. 4 is a flowchart of an example decoding method.

FIG. 4 is a flowchart of an example decoding method which could be used to decode a received chirp signal packet consisting of K chirp signal symbols indexed k=0 to K−1 having the form of equation (18) or similar. If necessary; a synchronisation process could be used to correct for timing and frequency errors prior to or during implementation of the method of FIG. 4.

At step S0 k is initialised to zero. At step S1 a chirp signal symbol is received. This step may involve some pre-processing such as filtering, amplification, mixing, multiplication etc. The received chirp signal symbol is then buffered at step S2. An integer index x is initialised to zero at step S3.

At step S4 the buffered chirp signal symbol is multiplied with a reference chirp having a gradient of $-(h_x - g_c)$ where gradients $h_x$ are selected from a set of H test gradients with x being the integers from 0 to H−1. At step S5 the output of step S4 is circularly correlated with a reference chirp of gradient $-g_c$ at each cyclic frequency offset $m_y$ of a set of M test cyclic frequency offsets, with y being selected from the integers from 0 to M−1, to produce a set of complex correlation results $C_{k,x,y}$ for y=0 to M−1. The correlator outputs a strong correlation peak when the multiplied chirp has gradient $g_c$ and, having been cyclically rotated by $m_y \cdot g_c^{-1}$ samples, is aligned with the gradient $g_c$ reference chirp, and smaller values in other positions.

These correlation results are buffered at step S6 and x is incremented by 1 at step S7. Step S8 sends the flow back to S4 to repeat the multiplication and correlation process for the next test gradient until every test gradient has been tried. The flow then continues to step S9 where the values of $g_k$ and $p_k$ for the current symbol are determined from the gradient index and position within its correlation results set of the largest overall correlation magnitude peak.

In one example, the test gradients $h_x$ consist of the gradients in the gradient symbol set, i.e. H=G and $\{h_0 \ldots h_{H-1}\}=$ {$g_0 \ldots g_{G-1}$}. In that case, $g_k$ is simply the gradient $h_x$ that produced the largest overall correlation magnitude.

In one example, the test cyclic frequency offsets $m_y$ consist of the cyclic frequency offsets in the cyclic frequency offset symbol set, i.e. M=P and {$m_0 \ldots m_{M-1}$}={$p_0 \ldots p_{P-1}$}. In that case, $p_k$ is simply the cyclic position offset $m_y$ that produced the largest overall correlation magnitude. This approach uses the least processing power, time and electrical power required to check for every cyclic position offset symbol value that could have been transmitted.

However, if the data is corrupted, whether in the transmitter, in the receiver or over the link between them, such that the cyclic frequency offset of the chirp is modified from that intended, it is possible that the cyclic frequency offset symbol value $p_k$ will not be identified correctly. As previously mentioned, this could arise due to oscillator phase noise, frequency error, multipath or other channel effects. Therefore in alternative examples, to increase the chances of decoding the cyclic frequency offset symbol value correctly (at the expense of some processing power, time and electrical power) additional cyclic frequency offsets are tried, i.e. M>P. The additional cyclic frequency offsets for example could be a small selection surrounding the possible cyclic frequency offset symbol values.

Alternatively, every possible cyclic frequency offset could be tried, i.e. M=N. In either case, decoding is performed by identifying which possible cyclic frequency offset symbol value is closest to the cyclic frequency offset $m_y$ that produced the largest overall correlation magnitude.

At step S10, the symbol index is checked. If k=0, $\phi_k$ is determined to be zero at step S11a since the phase modulation is differential. If k≠0, $\phi_k$ is determined to be the phase symbol value closest to the detected phase of the complex correlation result corresponding to the largest overall correlation magnitude peak. At step S12 the symbol index is checked again to determine whether the packet is complete. If it is, the flow ends. If not, k is incremented by 1 at step S13 and the flow returns to step S1 to receive the next chirp signal symbol.

The method of FIG. 4 offers a low gate count and low power solution.

Steps S4 to S6 illustrate an approach to correlation described in the present applicant's co-pending UK patent application publication number 2490140 in which a received chirp signal symbol is multiplied with a conjugate of a reference chirp with the current test gradient minus a fixed gradient $g_c$, and then the result of that multiplication is correlated with a reference chirp having that fixed gradient $g_c$ in all possible cyclic positions.

The fixed gradient $g_c$ could for example be unity. Alternatively, the chirp signal symbol could be directly correlated with a chirp having the current test gradient.

The predefined set of cyclic frequency offsets is suitably chosen such that each value in the set maps to a unique and distinguishable pattern of peak magnitudes in the correlation results. The decoder suitably analyses the main peak location and, in some examples, the relative magnitudes of specific side-peaks, to detect the cyclic frequency offset of the received chirp signal symbol. (If the cyclic frequency offset is fractional the main peak could occupy multiple bins.)

Preferably, the cyclic frequency offset symbol set is chosen so that, under ideal receiver conditions, each cyclic frequency offset in the set maps to a single correlator peak in a unique position, with all other bins being zero. The location of the largest correlation magnitude peak then determines the most likely integer cyclic frequency offset value as discussed above. The decoded value is the index of the frequency offset value in the predefined set that is closest to the most likely cyclic frequency offset value.

Typically, for a chirp of length N there are N unique cyclic frequency offsets that map to N unique and single correlator peak positions. For example, the set of N cyclic frequency offsets could be described by $n/N\,F_s$Hz, for n=0 to N−1, and for a sample rate of $F_s$Hz. In this example, in ideal receiver conditions, each integer value of n uniquely maps to a single largest peak position in the cyclic correlator correlation magnitude output and the side-bins are zero. In principle, more than N values could be encoded by using fractional values for n. In this case, the main peak location determines an integer part of n, and the relative magnitudes of side-bins can be used to determine the cyclic fractional offset of n. In the case of a decoder that comprises a chirp mixer that multiples the received chirp symbol by a conjugate chirp with gradient g−1, followed by a cyclic correlator using a chirp with gradient of 1, the side-bins that contain most of the fractional frequency information reside one sample either side of the main peak. If the correlation magnitude one sample to the left of the main peak is $|c_l|$, the main peak magnitude is $|c_p|$ and the correlation magnitude one sample to the right of the main peak is $|c_r|$, then the fractional cyclic frequency offset value $p_f$ can be approximated from:

$$f_r = \frac{|c_r|}{|c_r| + |c_p|} \quad |c_r| \geq |c_l| \quad (19)$$

$$f_r = \frac{-|c_l|}{|c_l| + |c_p|} \quad |c_r| < |c_l| \quad (20)$$

Suitably, the predetermined set of cyclic frequency offsets and their mapping to the associated correlator peak patterns are established prior to execution of the decoder.

Figure 5:
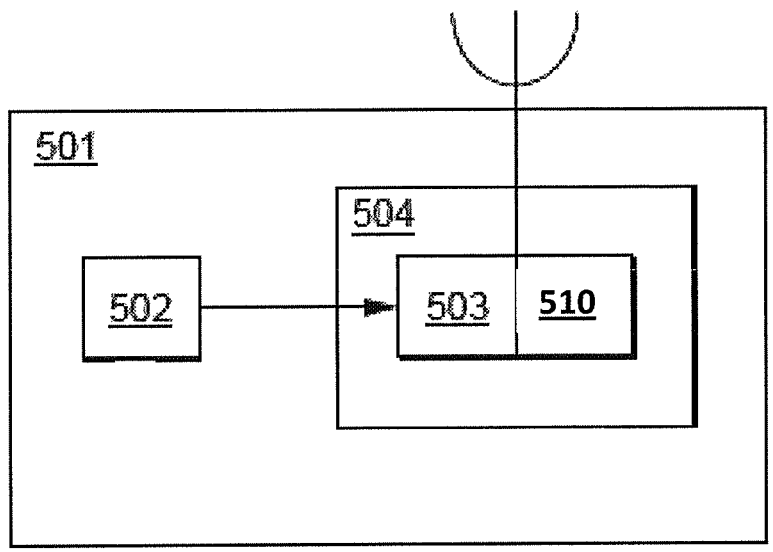
FIG. 5 illustrates an example communication system.
Figure 5:
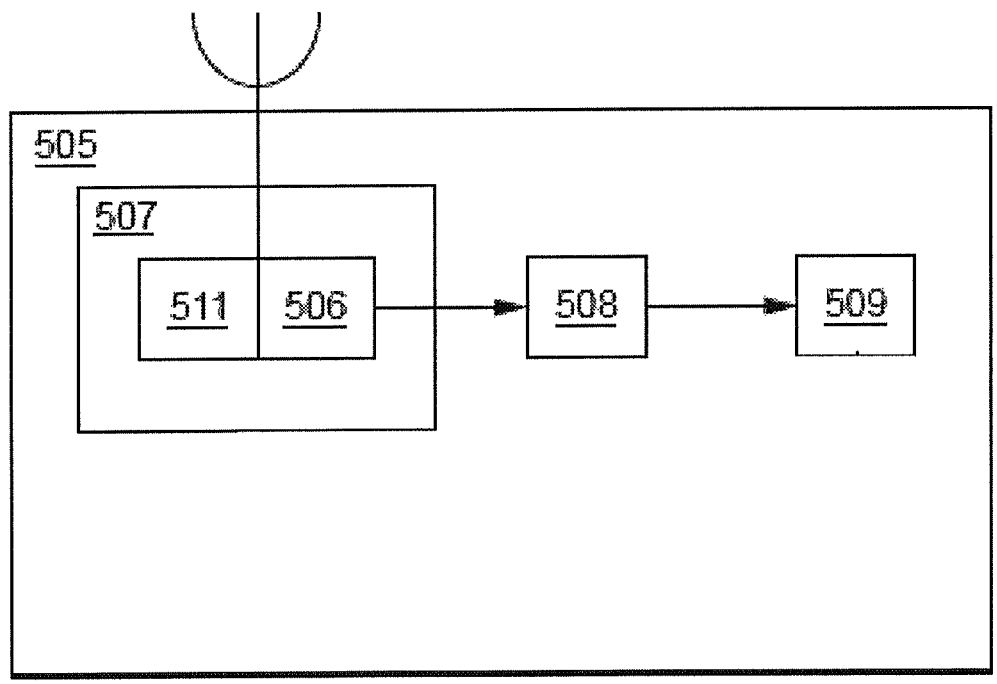

FIG. 5 illustrates an example system which could be used to implement transmission and reception of chirps as described.

Chirp signals can be transmitted by a transmitter device such as that shown schematically in FIG. 5. FIG. 5 shows exemplary components of a transmitter device 501 according to the methods described herein. This figure illustrates the layout of the transmitter device in terms of functional boxes. The operations of one or more of these functional boxes can be combined in the transmitter device or performed by separate components. It will be understood that this figure does not illustrate all those conventional components of a transmitter device known to a person skilled in the art.

Transmitter device 501 comprises a chirp former 502 which generates chirp signals for transmission by a chirp transmitter 503 comprised in an antenna unit 504.

In a specific example, the chirp signals produced by chirp former 502 may comprise chirps described by Zadoff-Chu codes. Suitably, contiguous symbols could have different Zadoff-Chu codes. Contiguous symbols could also have different centre frequencies. Using different Zadoff-Chu codes for each symbol provides a degree of coded separation, allowing more than one user to use the frequency spectrum at the same time.

Chirp signals can be received by a receiver device such as that shown schematically in FIG. 5. FIG. 5 shows exemplary components of a receiver device 505 according to the methods described herein. This figure illustrates the layout of the receiver device in terms of functional boxes. The operations of one or more of these functional boxes can be combined in the receiver device or performed by separate components. It will be understood that this figure does not illustrate all those conventional components of a receiver device known to a person skilled in the art.

Chirp receiver device 505 comprises a chirp receiver 506 comprised in an antenna unit 507 which receives chirp signals from a transmitter device such as transmitter device 501 and passes them to a correlating unit 508. Chirp receiver 506 could comprise one or more filters, amplifiers, baseband mixers etc. and may modify the chirp signals received by the antenna with these or in other ways before passing them to correlating unit 508. Correlating unit 508 correlates the received chirps with expected chirps and passes the correlation results to a processor 509. Processor 509 processes the correlation results in order to form estimates of the symbol values in the received chirp signal.

Chirp transmitter device 501 may optionally comprise a receiver 510 in antenna unit 504 which may optionally share an antenna with transmitter 503. Chirp receiver device 505 may optionally comprise a transmitter 511 in antenna unit 507 which may optionally share an antenna with receiver 506.

Figure 6:
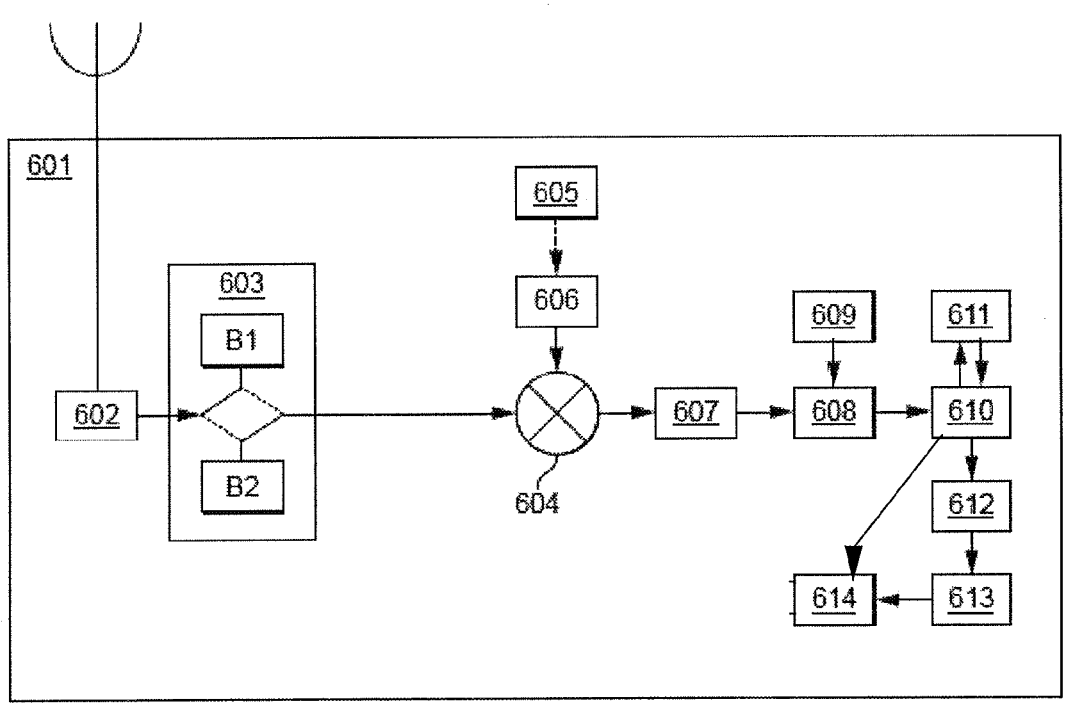
FIG. 6 illustrates an example receiver device.

Reference is now made to FIG. 6 which is a schematic diagram of the exemplary components of an example chirp receiver device 601 for implementing the decoding method described herein. FIG. 6 incorporates further components which are not necessarily required to implement the decoding method described herein. Chirp receiver device 601 is one way of implementing the chirp receiver device shown at 505 in FIG. 5. The functional boxes shown in FIG. 6 could be grouped to perform the functions of the higher level functional boxes shown comprised in chirp receiver device 505 of FIG. 5. FIG. 6 illustrates a schematic diagram showing exemplary components of a chirp receiver device according to the methods described herein. This figure illustrates the layout of the receiver in terms of functional boxes. The operations of one or more of these functional boxes could be combined. It is understood that this figure does not illustrate all of those conventional components of a receiver known to a person skilled in the art.

A chirp signal is received by a receiver unit 602. The samples of a received chirp of the chirp signal are input to a buffer module 603. Suitably, buffer module 603 comprises two buffers, B1 and B2. This enables one buffer to receive samples whilst the other buffer is being read. When the input buffer becomes full the two buffers are swapped over so that input samples are continuously sampled and stored without loss. The output buffer can be read multiple times. With suitably fast digital processing clock rates these buffers can provide a means to decode and track received chirps in real time.

The received chirp samples output from the buffer module 603 are input to a chirp multiplier 604. Under the control of a processor 605, a test chirp generator 606 generates a chirp mixer sequence which has a gradient which differs from the current test gradient by a fixed value. Preferably, this fixed value is 1. Preferably, the chirp mixer sequence has the same number of samples in a chirp N, bandwidth $F_s$ and centre frequency as the chirp output from the buffer module 603 is expected to have by the receiver.

Suitably, the chirp multiplier 604 multiplies the received chirp with the conjugate of the reference chirp generated by test chirp generator 606. The multiplied chirp output from the chirp multiplier 604 is input to a quantiser 607. The output of quantiser 607 is input to a correlator 608.

Suitably, the correlator 608 correlates the multiplied chirp with a conjugate of the fixed correlating chirp. The fixed correlating chirp has a gradient which is equal to the fixed value, preferably unity. The fixed correlating chirp is stored in store 609.

Suitably, the receiver device comprises a single correlator for the purpose of detecting the received chirp signal. Alternatively, the receiver device may comprise two or more correlators for the purpose of detecting the received chirp signal. The correlator described herein is a fixed correlator. This fixed correlator is configured to correlate the chirp signal input to the correlator with a fixed correlating chirp signal. This fixed correlating chirp signal has a fixed gradient. Preferably, the fixed gradient is 1. Alternatively, the fixed gradient could be 2 or some other value. The correlator only outputs a high correlation peak between two chirp signals having the same gradient and the same cyclic frequency offset. The use of a fixed gradient correlating chirp means that there are no registers required to hold a flexible correlating chirp. Additionally, the multipliers in the correlator are reduced to simple combinational logic, because the coefficients are known to the synthesis tools at compile time. The fixed correlator approach described herein consumes significantly less power than the conventional register based approach.

Returning to FIG. 6, the output of the correlator 608 is input into buffers 610. If a received symbol comprises a plurality of identical chirps, then the correlator output for each constituent chirp is stored in buffers 610. The correlator outputs of the identical chirps are then coherently integrated in coherent integrator 611 and stored in buffers 610. The reception, multiplication, correlation etc. is repeated until every test gradient has been tried.

The output of the buffers 610 is input to an absolute value module 612. The absolute value module returns the magnitude of the complex signal output by the correlator 608. The output of absolute value module 612 is analysed by principle peak detector 613 to find the largest overall correlation magnitude peak. Its identity including its cyclic position offset and the gradient set in which it was found is passed to decoder 614 which then retrieves the associated complex correlation result value from buffers 610 and uses this information to determine the values of g, p and φ as described above.

Suitably, the receiver and transmitter described herein are implemented in a system operating according to Bluetooth™ protocols.

Preferably, the chirp receiver and transmitter devices described herein are implemented in hardware. Alternatively, the chirp receiver and transmitter devices described herein may be implemented in software.

Suitably, the chirp receiver and transmitter devices described herein are implemented in long range radio communications. Typically, chirps are used for implementations that use a low data rate and low power. The chirp receiver and transmitter devices are suitable for use in high-sensitivity radio communications. Example implementations of the chirp receiver and transmitter devices are in a temperature sensor, a walkie-talkie or a wireless headset.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Aspects of the invention may be described by the following numbered points.

1. Apparatus for generating and encoding data onto chirp signals, said apparatus comprising:
   a chirp generator configured to generate a chirp;
   a cyclic frequency offset modulator configured to set the cyclic frequency offset of the chirp to a cyclic frequency offset selected from a plurality of predetermined cyclic frequency offsets; and
   a phase modulator configured to modulate the chirp onto a signal to form a chirp signal symbol at a phase offset selected from a plurality of predetermined phase offsets.
2. Apparatus as described in point 1, wherein said chirp generator is configured to generate said chirp with a gradient selected from a plurality of predetermined gradients.
3. Apparatus as described in points 1 or 2, wherein:
   the cyclic frequency offset modulator is configured to operate such that a first set of data bits is encoded by the chirp's cyclic frequency offset; and/or
   the phase modulator is configured to operate such that a second set of data bits is encoded by the chirp signal symbol's phase offset; and/or
   where the apparatus is as described in point 2, the chirp generator is configured to operate such that a third set of data bits is encoded by the chirp's gradient.
4. Apparatus as described in any preceding numbered point, further comprising a phase normaliser configured to cancel phase offsets which would otherwise be introduced by the chirp generator and/or cyclic frequency offset modulator.
5. Apparatus as described in any preceding numbered point, wherein the modulation performed by the phase modulator is differential phase modulation.
6. Apparatus as described in any preceding numbered point, wherein the modulation performed by the phase modulator is quadrature phase shift keying.
7. Apparatus as described in any preceding numbered point, wherein the encoding of the third set of data bits is by Gray encoding.
8. Apparatus as described in any preceding numbered point, wherein the chirp is a Zadoff-Chu chirp.
9. Apparatus as described in point 3 or any point dependent on point 3, further comprising a data rate modifier configured to, in response to detection of a change in signal conditions, change one or more of:
   the plurality of predetermined cyclic frequency offsets,
   the plurality of predetermined phase offsets, and
   where the apparatus is as described in point 3 or any point dependent on point 3 as dependent on point 2, the plurality of predetermined gradients such that a total number of data bits encoded by the chirp signal symbol is adjusted.
10. Apparatus as described in any preceding numbered point, wherein the chirp signal symbol comprises multiple identical chirps repeated contiguously.
11. Apparatus as described in any preceding numbered point further comprising an IQ modulator or a polar modulator.
12. A communication device comprising apparatus as described in any preceding numbered point together with a transmitter configured to transmit the chirp signal symbol or a modified version thereof.
13. Apparatus for decoding received chirp signals, said apparatus comprising:
    a cyclic frequency offset detector configured to compare the cyclic frequency offset of a received chirp signal symbol with a plurality of predetermined cyclic frequency offsets and decode a first set of data bits according to which of said plurality of predetermined cyclic frequency offsets the chirp signal symbol's cyclic frequency offset best matches; and
    a phase detector configured to compare the phase offset at which a chirp is detected in the received chirp signal symbol with a plurality of predetermined phase offsets and decode a second set of data bits according to which of said plurality of predetermined phase offsets the chirp signal symbol's phase offset best matches.
14. Apparatus as described in point 13, further comprising a gradient detector configured to compare the gradient of the received chirp signal symbol with a plurality of predetermined gradients and decode a third set of data bits according to which of said plurality of predetermined gradients the chirp signal symbol's gradient best matches.
15. Apparatus as described in point 13, wherein the gradient detector comprises a correlator.
16. Apparatus as described in point 15, wherein the cyclic frequency offset detector is configured to determine the cyclic frequency offset of the received chirp signal symbol from the location of the largest peak in a set of correlation results produced by the correlator.
17. Apparatus as described in point 16, wherein the cyclic frequency offset detector is configured to:
    determine an integer part of the cyclic frequency offset of the received chirp signal symbol from the location of the largest peak in a set of correlation results produced by the correlator; and
    determine a fractional part of the cyclic frequency offset of the received chirp signal symbol from the relative magnitudes of said largest peak and a side peak in said set of correlation results.
18. Apparatus as described in any of points 15 to 17, wherein the phase detector is configured to determine the chirp signal symbol's phase offset from the angle of the complex sample value defining the largest peak in the correlation results produced by the correlator.
19. Apparatus as described in any of points 13 to 18, wherein the chirp signal symbol's phase offset and the plurality of predetermined phase offsets are all defined differentially with respect to the phase offset of a previous chirp signal symbol that was the last chirp signal symbol to be received prior to the current received chirp signal symbol.
20. Apparatus as described in any of points 13 to 19, wherein the plurality of predetermined phase offsets consist of: 0, $\pi/2$, $\pi$ and $3\pi/2$.
21. Apparatus as described in any of points 13 to 20, wherein the decoding of the second set of data bits is by Gray decoding.
22. Apparatus as described in any of points 13 to 21, wherein the received chirp signal symbol comprises a Zadoff-Chu chirp.
23. Apparatus as described in any of points 13 to 22, wherein the received chirp signal symbol comprises multiple identical chirps repeated contiguously.
24. Apparatus as described in any of points 13 to 23, wherein the decoding of the first and/or second and/or, where the apparatus is as described in point 14 or any point dependent on point 14, third sets of data bits is performed in real time.
25. Apparatus as described in any of points 13 to 24, further comprising a receive buffer.
26. Apparatus as described in point 25 as dependent directly or indirectly on point 14, wherein said receive buffer comprises two parts configured to alternate roles; one part sampling the received chirp signal while samples of the received chirp signal sampled previously are read from the other part by the gradient detector.

27. Apparatus as described in either of points 25 as dependent directly or indirectly on point 14, or 26, wherein the gradient detector is configured to read a set of received chirp signal samples from the receive buffer once for each of the plurality of predetermined gradients.

28. Apparatus as described in point 15, or any point dependent on point 15, wherein the gradient detector is configured to:
    multiply the received chirp signal symbol with each of a plurality of reference chirps in turn or at least partially in parallel, each of said plurality of reference chirps having a gradient equal to a respective one of the plurality of predetermined gradients minus a fixed gradient;
    conjugate the multiplication results;
    correlate the conjugated multiplication results with a reference chirp having said fixed gradient; and
    determine which of said plurality of predetermined gradients the chirp signal symbol's gradient best matches according to which of said plurality of reference chirps yields the largest correlation peak.

29. A communication device comprising apparatus as described in any of points 13 to 28 together with a receiver configured to receive the received chirp signal.

30. A communication device as described in point 29 further comprising apparatus as described in any of points 1 to 11 together with a transmitter configured to transmit the chirp signal referred to in those points.

31. A communication system comprising a communication device as described in either of points 12 and 30 and a communication device as described in either of points 29 and 30.

32. A method for generating and encoding data onto chirp signals, said method comprising:
    generating a chirp;
    setting the cyclic frequency offset of the chirp to a cyclic frequency offset selected from a plurality of predetermined cyclic frequency offsets; and
    modulating the chirp onto a signal to form a chirp signal symbol at a phase offset selected from a plurality of predetermined phase offsets.

33. A method for decoding received chirp signals, said method comprising:
    comparing the cyclic frequency offset of a received chirp signal symbol with a plurality of predetermined cyclic frequency offsets and decoding a first set of data bits according to which of said plurality of predetermined cyclic frequency offsets the chirp signal symbol's cyclic frequency offset best matches; and
    comparing the phase offset at which a chirp is detected in the received chirp signal symbol with a plurality of predetermined phase offsets and decoding a second set of data bits according to which of said plurality of predetermined phase offsets the chirp signal symbol's phase offset best matches.

34. A computer program comprising code means adapted to perform the steps of either of points 32 or 33 when the program is run on processor apparatus.

35. A computer program embodied on a computer-readable medium, configured to control the method of either of points 32 or 33.

36. An apparatus, communication device, system, method or computer program substantially as herein described with reference to the accompanying drawings.

The invention claimed is:

1. Apparatus for generating and encoding data onto chirp signals, said apparatus comprising:
    a chirp generator configured to generate a chirp;
    a cyclic frequency offset modulator configured to encode data onto the chirp by setting the cyclic frequency offset of the chirp to a cyclic frequency offset selected from a plurality of predetermined cyclic frequency offsets; and
    a phase modulator configured to encode data onto the chirp by modulating the chirp onto a signal to form a chirp signal symbol at a phase offset selected from a plurality of predetermined phase offsets.

2. Apparatus as claimed in claim 1, wherein said chirp generator is configured to generate said chirp with a gradient selected from a plurality of predetermined gradients.

3. Apparatus as claimed in claim 2, wherein:
    the cyclic frequency offset modulator is configured to operate such that a first set of data bits is encoded by the chirp's cyclic frequency offset; and/or
    the phase modulator is configured to operate such that a second set of data bits is encoded by the chirp signal symbol's phase offset; and/or
    the chirp generator is configured to operate such that a third set of data bits is encoded by the chirp's gradient.

4. Apparatus as claimed in claim 3, further comprising a data rate modifier configured to, in response to detection of a change in signal conditions, change one or more of:
    the plurality of predetermined cyclic frequency offsets,
    the plurality of predetermined phase offsets, and
    the plurality of predetermined gradients
such that a total number of data bits encoded by the chirp signal symbol is adjusted.

5. Apparatus as claimed in claim 1, further comprising a phase normaliser configured to cancel phase offsets which would otherwise be introduced by the chirp generator and/or cyclic frequency offset modulator.

6. A communication device comprising apparatus as claimed in claim 1 together with a transmitter configured to transmit the chirp signal symbol or a modified version thereof.

7. Apparatus for decoding received chirp signals, said apparatus comprising:
    a cyclic frequency offset detector configured to compare the cyclic frequency offset of a received chirp signal symbol with a plurality of predetermined cyclic frequency offsets and decode a first set of data bits according to which of said plurality of predetermined cyclic frequency offsets the chirp signal symbol's cyclic frequency offset best matches; and
    a phase detector configured to compare the phase offset at which a chirp is detected in the received chirp signal symbol with a plurality of predetermined phase offsets and decode a second set of data bits according to which of said plurality of predetermined phase offsets the chirp signal symbol's phase offset best matches.

8. Apparatus as claimed in claim 7, further comprising a gradient detector configured to compare the gradient of the received chirp signal symbol with a plurality of predetermined gradients and decode a third set of data bits according to which of said plurality of predetermined gradients the chirp signal symbol's gradient best matches.

9. Apparatus as claimed in claim 8, wherein the gradient detector comprises a correlator.

10. Apparatus as claimed in claim 9, wherein the cyclic frequency offset detector is configured to determine the cyclic frequency offset of the received chirp signal symbol from the location of the largest peak in a set of correlation results produced by the correlator.

11. Apparatus as claimed in claim 9, wherein the phase detector is configured to determine the chirp signal symbol's phase offset from the angle of the complex sample value defining the largest peak in the correlation results produced by the correlator.

12. Apparatus as claimed in claim 9, wherein the gradient detector is configured to:
- multiply the received chirp signal symbol with each of a plurality of reference chirps in turn or at least partially in parallel, each of said plurality of reference chirps having a gradient equal to a respective one of the plurality of predetermined gradients minus a fixed gradient;
- conjugate the multiplication results;
- correlate the conjugated multiplication results with a reference chirp having said fixed gradient; and
- determine which of said plurality of predetermined gradients the chirp signal symbol's gradient best matches according to which of said plurality of reference chirps yields the largest correlation peak.

13. Apparatus as claimed in claim 7, wherein the chirp signal symbol's phase offset and the plurality of predetermined phase offsets are all defined differentially with respect to the phase offset of a previous chirp signal symbol that was the last chirp signal symbol to be received prior to the current received chirp signal symbol.

14. Apparatus as claimed in claim 7, wherein the received chirp signal symbol comprises multiple identical chirps repeated contiguously.

15. Apparatus as claimed in claim 7, wherein the gradient detector is configured to read a set of received chirp signal samples from a receive buffer comprised in the apparatus once for each of the plurality of predetermined gradients.

16. A communication device comprising apparatus as claimed in claim 7 together with a receiver configured to receive the received chirp signal.

17. A method for generating and encoding data onto chirp signals, said method comprising:
- generating a chirp; and
- encoding data onto the chirp by:
    - setting the cyclic frequency offset of the chirp to a cyclic frequency offset selected from a plurality of predetermined cyclic frequency offsets; and
    - modulating the chirp onto a signal to form a chirp signal symbol at a phase offset selected from a plurality of predetermined phase offsets.

18. A computer program embodied on a non-transitory computer-readable medium, configured to control a processor to perform the method of claim 17.

19. A method for decoding received chirp signals, said method comprising:
- comparing the cyclic frequency offset of a received chirp signal symbol with a plurality of predetermined cyclic frequency offsets and decoding a first set of data bits according to which of said plurality of predetermined cyclic frequency offsets the chirp signal symbol's cyclic frequency offset best matches; and
- comparing the phase offset at which a chirp is detected in the received chirp signal symbol with a plurality of predetermined phase offsets and decoding a second set of data bits according to which of said plurality of predetermined phase offsets the chirp signal symbol's phase offset best matches.

20. A computer program embodied on a non-transitory computer-readable medium, configured to control a processor to perform the method of claim 19.

* * * * *

UNITED STATES PATENT AND TRADEMARK OFFICE
CERTIFICATE OF CORRECTION

PATENT NO. : 8,971,379 B2
APPLICATION NO. : 13/911581
DATED : March 3, 2015
INVENTOR(S) : Hiscock It is certified that error appears in the above-identified patent and that said Letters Patent is hereby corrected as shown below:

In the Specification

In Column 5, Line 61, delete "$\Phi = 4; \varphi_i$" and insert -- $\Phi = 4; \varphi_\varepsilon$ --, therefor.

In Column 6, Line 10, delete "i=(0,1)" and insert -- i={0,1} --, therefor.

In Column 8, Line 36, delete "necessary;" and insert -- necessary, --, therefor.

Signed and Sealed this
Eighth Day of September, 2015

Michelle K. Lee
*Director of the United States Patent and Trademark Office*